United States Patent [19]

Hartman

[11] 4,425,396
[45] Jan. 10, 1984

[54] INSULATIVE PANEL
[75] Inventor: Richard E. Hartman, Akron, Ohio
[73] Assignee: The B. F. Goodrich Company, Akron, Ohio
[21] Appl. No.: 425,841
[22] Filed: Sep. 28, 1982
[51] Int. Cl.³ .............................. B32B 7/04; B32B 3/06
[52] U.S. Cl. ..................................... 428/220; 428/247; 428/284; 428/306.6; 428/309.9; 428/314.4; 428/316.6; 428/443
[58] Field of Search ............... 428/215, 220, 247, 255, 428/284, 285, 306.6, 308.4, 309.9, 314.4, 314.8, 316.6, 443

[56] References Cited

U.S. PATENT DOCUMENTS

| | | | |
|---|---|---|---|
| 3,616,171 | 10/1971 | Hoskinson, Sr. ................. | 428/319.7 |
| 3,873,406 | 3/1975 | Okazaki et al. ................. | 428/308.4 |
| 4,130,614 | 12/1978 | Saidla ............................. | 428/319.1 |
| 4,208,469 | 6/1980 | Dial ................................ | 428/314.4 |

*Primary Examiner*—William J. Van Balen
*Attorney, Agent, or Firm*—James R. Lindsay

[57] ABSTRACT

The panel (10) has a rigid foam layer (12) of synthetic organic polymeric foam, a protective weathering layer (14) of thermoplastic sheet material and a generally flexible backer layer (16) of stereoreticulate material interposed between the foam and weathering layers. Interstices (30) of the backer layer (16) adjacent the foam layer (12) are filled with the resin of the foam layer (12) providing a physical bond and a protective substrate (32) for the foam layer. The weathering layer (14) may be adhered to the backer layer (34) by application of heat.

6 Claims, 2 Drawing Figures

INSULATIVE PANEL

BACKGROUND OF THE INVENTION

This invention relates generally to panels for insulating and protecting walls and roofs and especially to laminated panels of foamed polymeric material. Panels of this type have proven to be effective. However to provide the desired surface strength with a low density foam, rigid plates or other protective layers have been required to resist deformation or damage to the panel. Also there has been a problem in preventing bowing or curling of the layers due to the variations in expansion and contraction of the weathering material and foam under the extreme temperature differentials to which these panels are subjected, especially when used for roofing.

SUMMARY OF THE INVENTION

The present invention is directed to a panel construction in which a backer layer of stereoreticulate material having multiple interstices therein is positioned between the foam layer and weathering layer. The interstices of the backer layer adjacent the foam layer are filled with the resin of the foam layer providing a physical bond between the backer layer and the foam layer. Also the filling of the interstices increases the strength of the backer layer so that a lower density foam can be used without requiring rigid plates or other protective layers. The backer layer also provides a flexibility to accommodate the variances in expansion and contraction of the weathering surface and foam layer due to temperature and humidity variations.

DETAILED DESCRIPTION

Figure 1:
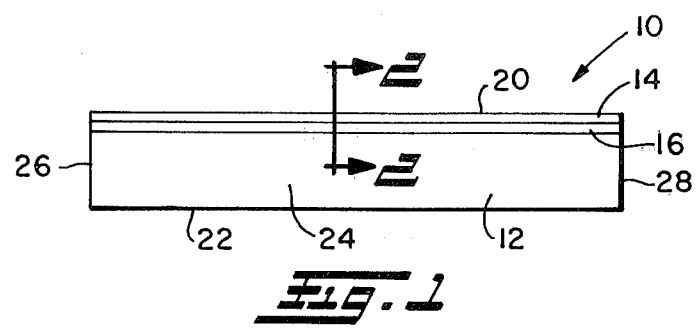
FIG. 1 is an edge view of an insulative panel embodying the invention.
Figure 2:
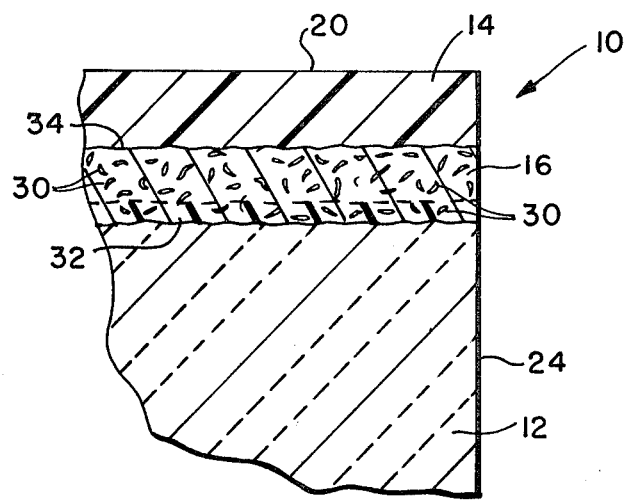
FIG. 2 is an enlarged fragmentary sectional view taken along the line 2—2 in FIG. 1.

Referring to FIGS. 1 and 2, an insulative panel 10 is shown embodying the invention having a foam layer 12, a weathering layer 14, and a backer layer 16. The panel 10 is preferably made in a continuous process wherein the weathering layer 14 and backer layer 16 are carried by a conveyor through a heated oven while the foam layer 12 is being foamed. Upon passage of the composite layers from the oven, the weathering layer 14, backer layer 16 and foam layer 12 will be united in a composite structure with an upper surface 20 substantially parallel to a lower surface 22 and with parallel edges 24. This composite structure may then be cut at a front edge 26 and a rear edge 28 to provide the panel 10 of desired length. The cut panel 10 may be of any desired length depending upon the needs of the customer.

The foam layer 12 may be formed from a variety of synthetic, organic, polymeric materials, all of which produce low density, lightweight, low-heat transmission, substantially rigid foams. Without limitation on the generality of useful materials, the foam may be formed of a polyurethane resin, a vinyl resin (e.g., polyvinyl chloride, copolymers of vinyl chloride and vinyl acetate), epoxy resins, phenolic resins (e.g., phenol formaldehyde), polyethylene resins, silicone resins, urea formaldehyde resins, polystyrene, acrylic resins, synthetic rubber and the like.

A particularly suitable foam layer 12 is one formed of a foam having closed cells. This provides a foam haivng excellent heat insulating properties and extremely low permeability to moisture. However, a foam layer formed of foam having open cells may also be used.

The thickness of the foam layer 12 can vary over wide limits depending on the environment in which the insulative panel 10 is to be used, the density of the foam, the nature of the synthetic, organic, polymeric materials forming the foam and the insulation requirements of the particular application for the insulative panel. In general, however, the thickness of the foam layer 12 for most applications will be within the range of about one-half inch to about four inches or more. In the embodiment shown, the thickness of the foam layer 12 is at least one inch and preferably two to four inches.

The backer layer 16, which is interposed between the foam layer 12 and weathering layer 14, is of a stereoreticulate material having multiple interstices 30 in communication with the foam layer 12. The backer layer 16 may be of a fibrous material woven or nonwoven with the fibers being of a reinforcing nature such as asbestos, fiberglass or aluminum. The interstices 30 are of a sufficient size to permit entrance of the resin produced during the foaming process into the interstices of the backer layer 16 adjacent the foam layer 12 as in border portion 32 of the backer layer but do not permit striking entirely through the thickness of the backer layer which would stiffen the backer layer and reduce the flexibility which is desirable to accommodate the variances in expansion and contraction between the foam layer and the weathering layer 14. In the border portion 32, the interstices 30 are filled by resin from the foaming process so that the fibers abutting the foam layer 12 are surrounded by foam and provide a physical bond between the foam layer and backer layer 16.

In the embodiment shown, the backer layer 16 is of nonwoven asbestos fibers having a thickness of at least 10 mils and preferably 15 mils.

The weathering layer 14 is of a flexible, elastic sheet having thermoplastic properties so that it may be anchored to the fibers of the backer layer 16 by entrance into the interstices 30 at an upper surface 34 of the backer layer when heated in contact with each other either before or during the foaming process as the weathering layer and backer layer are passed through the oven. In the embodiment shown, the weathering layer 14 is of chlorosulfonated polyethylene having a thickness of at least 15 mils and preferably 20 mils with an elongation of around 370 percent and a tensile strength of around 1,304 psi.

With the construction of the panel 10, described hereinabove, the backer layer 16 has a border portion 32 of resin from the foaming process which fills the interstices 30 of the fibrous material and after hardening provides a reinforced substrate. The border portion 32 supports the weathering layer 14 and resists deformation or damage to the foam layer 12 as by hail, handling, or through damage from walking on the roof after the panel 10 has been installed. The backer layer 16 of fibrous material between the border portion 32 and upper surface 34 has a flexibility which is important in accommodating the variances in expansion and contraction between the weathering layer 14 and the foam layer 12 due to the wide variations in temperature and humidity to which the panel 10 may be subjected on a roof of a building. Without this flexibility, the weathering layer 14 may be ruptured or the bond between the layers broken, permitting entrance of moisture and eventual distruction of the panel 10. Also warping or curling may occur if such flexibility is not present.

The border portion 32 provides a stiffness at the interface between the backer layer 16 and foam layer 12 which reduces the stress on the foam so that a lower density foam can be used. The lower density foam decreases the weight of the panel 10 which is desirable for decreasing the weight which must be supported by a building and also the weight of the panels which must be transported to the job site and at the job site. The use of a lower density foam also can provide improved heat insulation.

With the foregoing disclosure in mind, many and varied obvious modifications of this invention will become readily apparent to those of ordinary skill in the art.

I claim:

1. An insulative panel comprising a foam layer of synthetic, organic, polymeric foam, a weathering layer, and a backer layer interposed between said foam layer and said weathering layer, said backer layer being a stereoreticulate material having multiple interstices therein, the said foam material of said foam layer penetrating into and filling the interstices of said backer layer along the interface border portion between said foam layer and said backer layer and partway through the thickness of said backer layer, the interstices of said backer layer adjacent the interface of said weathering layer and said backer layer being free of said foam material of said foam layer whereby a bond is provided between said backer layer and said foam layer and flexibility of said backer layer is retained, said weathering layer being adhered to said backer layer along the interface of said weathering layer with said backer layer.

2. An insulative panel in accordance with claim 1 wherein said backer layer is of a fabric containing fibers and said fibers in said border layer being surrounded by the material of said foam layer to provide a physical bond between said foam layer and said backer layer.

3. An insulative panel in accordance with claim 1 wherein said weathering layer is thermoplastic and is anchored to the material of said backer layer by the application of heat.

4. An insulative panel in accordance with claim 1 wherein said foam layer is of polyurethane, said backer layer is of asbestos and said weathering layer is of chlorosulfonated polyethylene.

5. An insulative panel in accordance with claim 4 wherein the thickness of said weathering layer is around 20 mils, the thickness of said backer layer is at least 10 mils and preferably 15 mils and the thickness of said foam layer being at least one inch and preferably two to three and one-half inches.

6. An insulative panel in accordance with claim 1 wherein the percentage of elongation of said weathering layer is around 370 percent and the tensile strength is around 1304 psi.

* * * * *